United States Patent Office 3,546,016
Patented Dec. 8, 1970

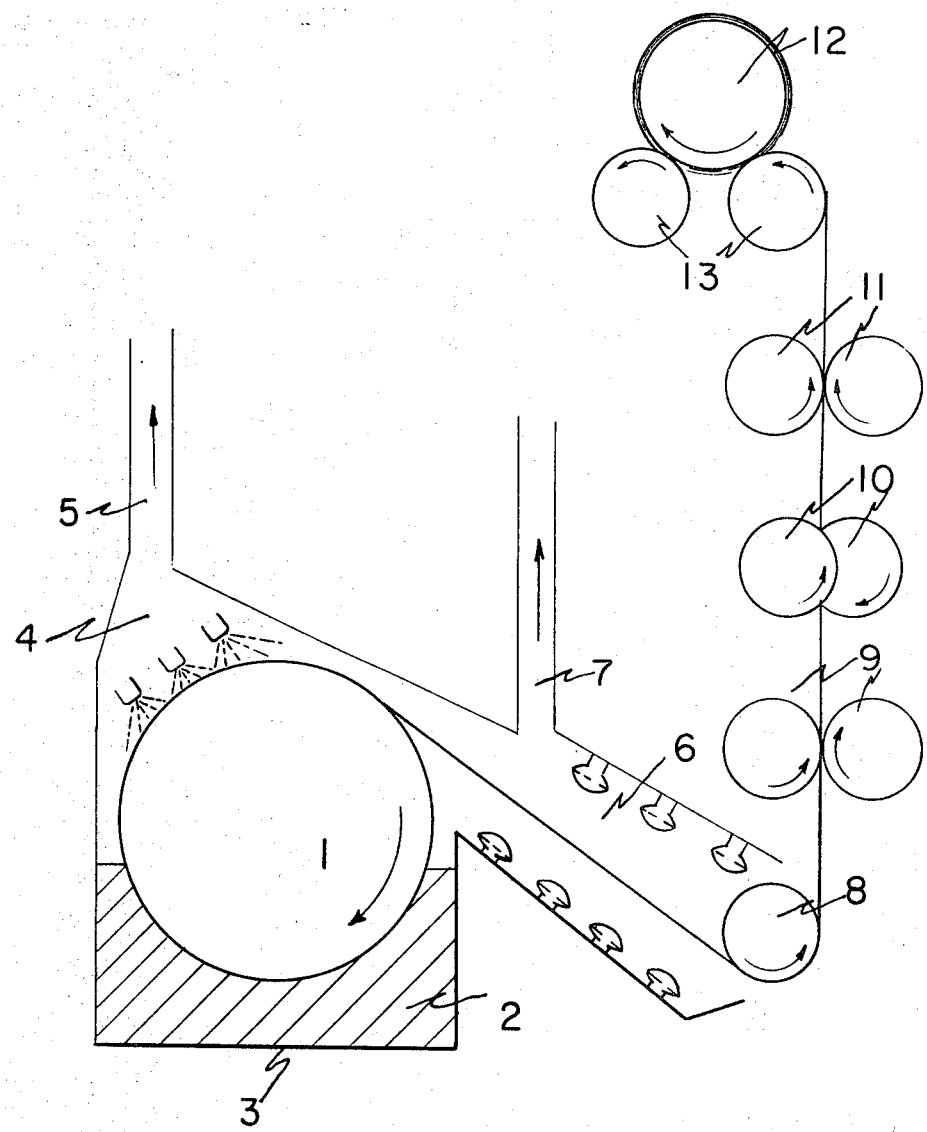

3,546,016
METHOD OF COATING A METAL ARTICLE
WITH POLYMERIC MATERIAL
William A. Pavelich, Kent, Ohio, and Charles F. Mosier, Jr., Overland Park, Kans., assignors to Gulf Oil Corporation, Pittsburgh, Pa., a corporation of Pennsylvania
Filed June 15, 1965, Ser. No. 464,132
Int. Cl. B44d 1/134
U.S. Cl. 117—232         7 Claims This invention relates to a method of forming protective coatings, self-supporting films and plastic articles of relatively thin cross-section and complex shape. More particularly, this invention deals with a method of forming plastic articles by controlled gelation of solvated polymers from aqueous systems.

In the past, protective metallic coatings have been formed on conductors by electrodeposition. However, it is well known that formation of coatings by this technique often requires specially shaped electrodes, and in many instances complex assemblies cannot be successfully plated with a uniform coating. Inaccessible portions of complex assemblies, for example in auto bodies, will often be unprotected and these are the very places where moisture accumulates and protection against corrosion is needed most. It has recently become the practice to protect these places by dip-coating after zinc plating a portion of the metal parts before assembly. Uniform coating by dipping, however, requires special design to provide for efficient draining and ventilation. Unfortunately, it is virtually impossible to inspect the areas in which the coating is needed most. Uncoated areas often result, particularly in confined spaces where solvent evaporation is very slow and the paint thereon has a greater tendency to run. Various thickening agents and gelation promoters have been tried in an effort to prevent paint from running off poorly ventilated areas after dipping. So far the methods tried have been only partially successful.

A more recent practice is to coat complex welded steel assemblies by anodic deposition of primer coatings based on dispersed polymers, the particles of which are negatively charged. By making the metal to be coated the anode in the solution, the electrical conductivity of the system continuously decreases as the coating is formed on the metal. This has the effect of causing selective electrodeposition on the areas of the metal which remain uncoated, or which have coatings containing pinholes or other openings or defects. The over-all result is the formation of a continuous coating on all exposed areas of the metal. However, it is inherent in the nature of water soluble polyelectrolytes which electroplate efficiently that when the power supply is turned off, they will also go back into solution readily. This characteristic results in formation of runs and thin areas in coatings. Electrically charged dispersions of water-insoluble resins, on the other hand, do not electroplate efficiently and form coatings which are water-sensitive because they contain auxiliary surface active agents such as emulsifiers and dispersants.

It has now been dicovered that protective coatings, self-supporting films and articles of complex shape may be made from polymers possessing limited solvation in aqueous solvent systems by a controlled gelation technique which possesses obvious advantages. Briefly, our method comprises the following steps:

It has now been discovered that protective coatings, self-supporting films and articles of complex shape may be made from polymers possessing limited solvation in aqueous solvent systems by a controlled gelation technique which possesses obvious advantages. Briefly, our method comprises the following steps:

(a) Initiating gelation of a solvated polymer in an aqueous solvent system, said polymer having a hydrocarbon chain structure, possessing at least two carboxy substituents per mole and a degree of solvation such that neutralization of a minor proportion of the anionic sites on the polymer molecules results in agglomeration of the polymer;

(b) Accumulating a body of polymer gel adjacent to a locus of initation;

(c) Removing the accumulated polymer gel from the aqueous system; and (d) Removing water from the polymer gel to yield a solid article of manufacture.

The drawing illustrates diagrammatically the manufacture of self-supporting film as a specific embodiment of the method.

As will be evident upon reading the following description of the method, the solvated polymer employed must have a minimum of two ionic substituent groups per molecule which are sufficiently free from the shielding or other interference by other substituent groups that they are able to form ionic bridges or cross-linkages between adjacent polymer molecules. Suitable water-dispersible polymers may be selected from a group of ethylene copolymers consisting of:

(1) Polymers containing 80–97.6 mol percent of units (a) and, correspondingly, 20–2.4 mol percent of units (b), (2) Polymers containing 80–97.6 mol percent of units (a) and, correspondingly, 20–2.4 mol percent of a mixture of units (b) and (d), (3) Polymers containing 80–97.6 mol percent of units (a) and, correspondingly, 20–2.4 mol percent of a mixture of units (b) and (c), (4) Polymers containing 80–97.6 mol percent of units (a) and, correspondingly, 20–2.4 mol percent of a mixture of units (b), (c) and (d), and (5) Mixtures of (1), (2), (3) and (4): said units (a) having the structure $$-CH_2-CH_2-$$

said units (b) having the structure

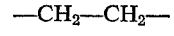

said units (c) having the structure

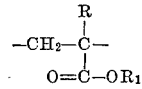

and said units (d) having the structure

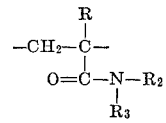

wherein R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the copolymers dispersible in an aqueous solvent system.

Preferably the water dispersible polymers are selected from uniform random ethylene copolymers containing 67–99 mol percent of units (a) and, correspondingly, 33–1 mol percent of a mixture of units (b), (c) and (d); said units (b) constituting 5–70 mol percent of the total of units (b), (c) and (d); said units (c) constituting 20–80 mol percent of the total of units (b), (c) and (d); and said units (d) constituting a maximum of 75 mol percent of the total units of (b), (c) and (d); said units (a) having the structure $$-CH_2-CH_2-$$

said units (b) having the structure

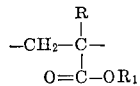

said units (c) having the structure

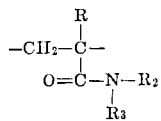

and said units (d) having the structure

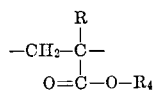

wherein R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers dispersible in aqueous solvent systems.

A carboxy-substituted polymer which is solvated by water to a limited degree and is particularly suitable for the method of this invention may be made by copolymerizing ethylene with an acrylate ester, followed by hydrolysis of the ester groups on the resulting polymer. Uniform, random copolymers of ethylene with from about 15 to 40 weight percent of methyl acrylate have been found particularly useful for this purpose.

Preferably, uniform copolymers of ethylene with methyl acrylate are reacted with an aqueous solution of ammonia and sodium or potassium hydroxide, as in Example 1, so that a part of the ester groups are converted to corresponding amide structures as well as corresponding acid and sodium carboxylate groups. The amide, or carbamyl substituents are found to increase the stiffness and reduce the solvation of the resulting polymer product, without a deleterious effect on transparency or low temperature brittleness. Typical copolymer products obtained by this general method are exemplified for illustrative purposes in the following table. All of the products in the table were tough solids, free from brittle failures at minus 70° C.

As an aqueous solvent system, water may be used alone with the solvated polymers dispersed therein, preferably with the carboxy substituents in salt form. Water containing small amounts of alkaline substances, inorganic or organic salts, and miscible auxiliary solvents, such as water-soluble alcohols may also be employed. It is, in fact, desirable to adjust the degree of solvation of the polymer in many instances by adding auxiliary substances to the aqueous system. The degree of solvation which is desired is such that although the solvated polymer exhibits no pronounced tendency to gel immediately, once initiated, the gelation process becomes self-sustaining.

In an aqueous system containing a polymer of limited solvation such as referred to above, gelation may be initiated by desolvating a small fraction of the total amount of polymer which is present. To obtain a fairly uniform coating on a solid article immersed in the aqueous system it is only necessary to desolvate a scattering of polymer molecules adjacent to the solid surface. It is unnecessary, in fact, to initiate gelation of a complete monomolecular layer of polymer on a solid object in order to obtain a film which will completely cover the surface. If the solid is an electrical conductor, a properly sustained positive electrical charge on the solid conductor is sufficient to effectively initiate gelation. If the solid is a nonconductor, the object may be heated before immersion. Contact of cooler solvated polymer with the heated surface will initiate gelation, the gelation continuing subsequent to cooling of the warm surface. If it is inconvenient to apply either an electrical charge or a thermal gradient to initiate gelation, a reactive chemical may be placed on the solid surface before immersing and gelation will be initiated by chemical desolvation of solvated polymer in the immediate vicinity of the treated solid surface.

In the case of a polymer possessing limited solvation in an aqueous system, when water molecules are driven off of two polymer molecules adjacent to each other the ionic substituent groups quickly form ionic bridges between the adjacent molecules by reaction with ions of opposite charge. For example, carboxy substituent groups on adjacent polymer molecules form a bridge by their common attraction to a single cation. The desolvated water in the vicinity of the two polymer molecules acquires increased activity and therefore a tendency to move away from the present location. The moving away of desolvated water in turn increases the possibility of solvated polymer molecules coming in contact with desolvated polymer molecules which have formed ionic bridges between them. As more polymer molecules approach, these in turn form ionic bridges with polymers already in place, lose at least a part of their water of solvation and become oriented with respect to each other in a gel structure. This process continues until the body of gel is removed from the aqueous system or until substantially all the solvated polymer

TABLE I.—CHEMICAL AND PHYSICAL PROPERTIES OF SOLVATED COPOLYMER

| Sample No. | Relative mol percentages of substituents | | | | Tensile (p.s.i.) | | Percent elong. | Shore D hardness | Stiffness (p.s.i.) |
|---|---|---|---|---|---|---|---|---|---|
| | Carboxylate salt | Amide | Acid | Ester | Yield | Break | | | |
| 1 | 80.0 K | | 8.0 | | 1,568 | 6,700 | 628 | 58 | 22,860 |
| 2 | 49.6 Na | 20.8 | 26.2 | 3.45 | 2,246 | 7,910 | 588 | 61 | 36,630 |
| 3 | 67.0 Na | 17.0 | 11.8 | <1.5 | 2,202 | 7,072 | 475 | 60 | 34,490 |
| 4 | 50.0 Na | 28.1 | 18.9 | 3.0 | 2,064 | 7,466 | 553 | 58.6 | 35,065 |
| 5 | 48.4 Na | 10.6 | 35.6 | 5.4 | 2,315 | 5,858 | 513 | 58 | 44,830 |
| 6 | 75.5 Na | 13.3 | 9.7 | <1.5 | 1,965 | 4,698 | 406 | 61 | 32,980 |
| 7 | 36.4 Na | 20.0 | 34.0 | 12.5 | 1,776 | 6,502 | 645 | 55 | 29,200 |
| 8 | 50.0 Na | 33.9 | 11.4 | <1.5 | 2,054 | 5,854 | 564 | 61.6 | 46,300 |
| 9 | 36.2 K | 34.8 | 22.8 | 6.2 | 2,435 | 6,852 | 616 | 61 | 34,935 |
| 10 | 47.7 Na | 34.8 | 16.3 | <1.5 | 1,495 | 3,972 | 576 | 58 | 31,950 |
| 11 | 4.2 Na | 50.6 | 43.7 | <1.5 | 1,718 | 5,003 | 715 | 55 | 43,380 |
| 12 | 52.2 Na | 29.9 | 15.3 | <1.5 | 922 | 1,709 | 564 | 44 | 18,045 |
| 13 | 50.3 Na | 27.4 | 13.5 | <1.5 | 1,714 | 4,955 | 512 | 55 | 23,065 |
| 14 | 48.7 Na | 6.6 | 4.01 | 46.5 | 1,295 | 5,425 | 588 | 49 | 13,820 |
| 15 | 58.5 Na | 11.1 | 12.4 | 18.6 | 1,453 | 6,129 | 603 | 48 | 23,150 |
| 16 | 20.6 K | 45.8 | 32.1 | <1.5 | 1,986 | 6,358 | 726 | 57 | 37,080 |
| 17 | 28.2 K | 37.5 | 32.8 | <1.5 | 2,033 | 6,793 | 692 | 57.5 | 33,600 |
| 18 | 36.8 K | 34.8 | 26.9 | <1.5 | 1,256 | 4,403 | 751 | 46 | 15,150 |
| 19 | 45.4 K | 27.5 | 25.6 | <1.5 | 1,787 | 6,812 | 655 | 58.5 | 43,200 |
| 20 | 35.7 Na | 40.8 | 22.7 | <1.5 | 1,192 | 3,789 | 718 | 46 | 23,825 |
| 21 | 37.8 Na | 39.3 | 22.3 | <1.5 | 2,219 | 7,446 | 613 | 59 | 31,694 |
| 22 | 44.6 Na | 35.4 | 21.7 | <1.5 | 2,249 | 6,157 | 548 | 58 | 45,264 |
| 23 | 49.6 Na | 30.2 | 18.8 | <1.5 | 2,157 | 6,077 | 487 | 56 | 37,990 | is gelled. The gelation occurs in a manner which might be described as the operation of a dialysis cell in which the membrane is in the process of assembling itself. The rate at which the membrane assembles itself will depend on the magnitude of the activity gradients in polymer and solvent in the system. This is so because the gradients in both polymer and solvent activity provide the driving forces for diffusion of polymer to the gel and diffusion of water away from the gel. Under isopotential and isothermal conditions, these gradients will be small because they are established only by differences in solvation of the polymer in the gel and in concentration of the surrounding solution. The rate of polymer deposition after the initiation of gelation may be enhanced by two means; (1) increasing the transport of polymer to the gel-solution interface and (2) increasing the activity gradient between gel and solution. These means of enhancing the rate of deposition may be employed singly or in concert. Transport of polymer anions to the gel-solution interface can be increased by maintaining a flow of direct current between the surrounding solution and the gel after initiation of the gelation. An enhanced activity gradient between gel and solution can be established by increasing the polymer concentration in the solution or by maintaining a temperature difference beween the gel and solution after initiation of gelation. An enhanced activity gradient is established by a thermal gradient because the cohesive energy density of a solvent is a function of temperature and decreases with increasing temperature. The ability of a solvent to solvate a solute depends on the match between the cohesive energy density of the solvent and solute. Thus, any external force that will increase the mismatch in cohesive energy density between solvent and solute will reduce the solvation power of the solvent. Maintaining a thermal gradient between the gel and the surrounding solution of polymer produces a gradient in cohesive energy density. This gradient in cohesive energy density establishes a gradient in polymer and solvent activity across the gel-solution interface. Increasing the activity gradient across the interface increases the driving forces for counter diffusion of polymer and solvent and increases the rate of polymer deposition. Initiation of gelation followed by the imposition of an external force that improves transport of polymer to the gel-solution interface is the preferred method of gelation to form a useful coating or article. The mechanism by which the polymer molecules orient and attach themselves in the gel is analogous to crystallization of a substance from a supersaturated solution. Both processes only occur after initiation, and once initiated, are self-sustaining.

In order to form a solid article the body of polymer gel, after removal from the aqueous system, should be dewatered. If dewatering is carried out at a fairly uniform rate throughout the gel, a tough coherent structure will result. If desired, dewatering may be carried out in two stages. In the first stage the wet polymer gel is preferably steamed to yield a structure sufficiently strong to be self-supporting, which may then be lifted from a solid substrate and subsequently further dried to yield translucent to transparent articles of thin cross-section possessing good mechanical properties. This method is particularly desirable as a technique for production of self-supporting plastic film. Alternatively, the film may be left on a solid substrate to yield a tough impervious protective coating. In the use of the method to form protective coatings, the presently preferred dewatering procedure is steam-setting followed by baking.

Dyestuffs, pigments, and solid fillers, preferably of colloidal size with respect to at least one dimension, may be dispersed in the aqueous system so that they become trapped in the polymer gel in a uniform state of dispersion. For example, cellulose pulp, colloidal silica, pulverized exfoliated vermiculite and other solids may be included in the aqueous system containing solvated polymer. Furthermore, polymer structures may be fabricated by carrying out the gelation in the presence of a reinforcing web such as a glass fiber or nylon fabric or mat, hardware cloth or other preformed reinforcing material.

So that the invention may be more readily understood, the following examples are presented by way of illustration and not by way of limitation.

EXAMPLE I

A substantially uniform copolymer made by copolymerization of ethylene with 20 percent by weight methyl acrylate was converted to an aqueous dispersion by heating in a stirred autoclave at 240° C. for six hours a mixture of the following: polymer, 20 lb.; water 90 lb.; 28 percent ammonium hydroxide, 12 lb.; sodium hydroxide, 300 grams. The product obtained was an aqueous dispersion having a milky appearance. The chemical and physical properties of the dispersed polymer corresponded closely to those of Sample No. 23 in Table I above. Using a platinum cathode, small metal samples were coated in a bath of the polymer dispersion at a potential of 4.5 volts. Stainless steel, copper and platinum were coated equally well at this potential.

EXAMPLE II

An aqueous dispersion of polymer was prepared as in Example I. The free ammonia content of this material was subsequently reduced to less than 1 percent by weight by vacuum stripping. The polymer solids content of the dispersion after ammonia removal was 20 percent by weight. This polymer dispersion was placed in an electro gelation cell consisting of a platinum gauze anode surrounding a platinum wire cathode. The gelation cell was connected in series with a silver coulombmeter to a source of variable voltage direct current. A current of 30 milliamperes was passed through the gelation cell. The potential drop across the gelation cell was 3.6 volts. During deposition the gelation cell was maintained at room temperature. The dry weight of polymer deposited after 129 minutes was 418.45 milligrams. The total charge passed through the cell as determined by the silver coulombmeter was 99.04 coulombs. The weight to charge ratio was 4.23.

EXAMPLE III

An aqueous dispersion of polymer prepared as in Example II was reduced to 10 percent by weight of polymer solids by dilution with distilled water. This dilute dispersion was placed in the gelation cell described in Example II. A current, which decreased from an initial value of 30 to a final value of 22 milliamperes, was passed through the cell for 122 minutes. The potential drop across the electrodes in the gelation cell was increased from an initial value of 3.9 volts to a final value of 4.6 volts in an attempt to keep the cell current constant. The total charge passed through the cell as determined by the silver coulombmeter was 151.06 coulombs. The dry weight of polymer deposited was 279.26 milligrams for a weight to charge ratio of 1.80. Compared to Example II the efficiency of deposition as measured by the weight to charge ratio was less. The lowered efficiency with reduced solution phase polymer concentration, i.e. reduced polymer activity, illustrates the advantage of simultaneously increasing both transport of polyions and the activity gradients of the polymer and solvent.

EXAMPLE IV

The preceding examples employed relatively long deposition times. Deposition proceeds initially at a rapid rate. However, as gel builds up on the anode, the current that can be forced through the cell to transport polyions to the growing gel-solution interfaces falls off because of the high electrical resistance of the gel phase. Deposition then slows to a value determined by the diffusivity of the polymer solution and the magnitude of the activity gradients that are the driving forces for diffusion. This restriction on the rate of gel deposition can be overcome by a multiple layering technique wherein successive layers of gel are deposited. Between depositions the previously deposited gel layer is cured by steaming followed by oven drying as described previously. By way of example, the following is cited. An aqueous polymer solution containing 20 percent by weight of polymer solids was prepared and charged to the gelation cell as described in Example II. An electrical potential of 12.0 volts D.C. was maintained across the cell electrodes for one minute. The current was 200 milliamperes. A deposit consisting of 97.60 milligrams of polymer solids was formed. After oven drying, the previously coated anode was reinserted in the cell and a potential of 12 volts again applied for one minute. The current flow on this second pass rapidly decreased from an initial level of about 200 milliamperes to a final value of 10 milliamperes. The dry weight of polymer deposited was 15.73 milligrams. After drying, the previously coated anode was reinserted in the cell for the third time. An electrical potential of 12 volts was again imposed for one minute. The current value was constant at about 0.8 milliampere, the dry weight of polymer deposited was 14.67 milligrams for a total of 128.0 milligrams. Deposition of gel during the second and third treatments was observed to occur on areas of the anode not previously coated or on areas on which faults had developed during drying.

EXAMPLE V

A polymer dispersion containing 20 percent by weight of polymer solids was prepared as in Example II. The dispersion was then diluted with methanol to a polymer solids content of 10 percent by weight. This dispersion of polymer was charged to the previously described gelation cell. A D.C. potential of 5.4 volts was impressed on the cell for 250 minutes. The current decreased from an initial value of 15 milliamperes to a final value of 7.5 milliamperes. The dry-weight of polymer deposited was 249.03 milligrams. The charge transferred through the cell was 106.77 coulombs for a weight to charge ratio of 3.27 milligrams/coulomb.

EXAMPLE VI

A mixture of polymer dispersion containing 20 percent by weight of polymer solids (prepared as in Example II) and a slurry of 50 percent by weight of paper pulp in water was prepared in the following proportions

|  | Gm. |
|---|---|
| Polymer dispersion (20% solids) | 90 |
| Paper pulp slurry (50% paper solids) | 10 |

The resulting mixture had the following composition

|  | Wt. percent |
|---|---|
| Polymer solids | 18 |
| Paper solids | 5 |
| Water | 77 |

This slurry of paper pulp in a polymer dispersion was charged to the previously described gelation cell and a D.C. potential of 4.4 volts applied for 50 minutes. The current fell from an initial value of 60 milliamperes to a final value of 10 milliamperes. The dry weight of solids deposited was 466.85 milligrams. The charge transferred through the gelation cell was 49.25 coulombs. The weight to charge ratio was 9.46 milligrams/coulomb. On visual examination, the deposited gel appeared to have paper pulp fibers dispersed throughout the solid polymer. An infrared spectrum obtained on the deposited gel confirmed the presence of cellulosic materials.

EXAMPLE VII

Flat self-supporting film of good barrier properties which is particularly useful in laminating is manufactured from the aqueous dispersion of polymer of Example I by the method described below.

Referring to the drawing, gelation is initiated as the surface of casting drum 1 enters aqueous polymer dispersion 2. Preferably the ends of the cylindrical drum are kept at the temperature of the polymer dispersion and are made of electrically non-conducting material such as a reinforced polymer. An electric potential is maintained between the cylindrical surface of the drum and the reservoir 3 so that gelation at the surface of the drum is initiated by electrodeposition in combination with a thermal gradient which results from heating of the drum.

The wet polymer gel which forms on the surface of the drum is then steamed in the steaming zone 4, removing considerable moisture which escapes through vent 5 resulting in toughening of the film. The partially dried film is then lifted from the surface of the drum and passes into the drying zone 6 which may conveniently be equipped with infrared lamps or other heating devices. Moisture escapes from this zone through vent 7.

As the dried film is carried away from the drying zone it passes under roll 8 and then between a first pair of nip rolls 9. The edges of the sheet of film are trimmed by rotary trimming knives 10. The trimmed film then passes through a second pair of nip rolls 11 which, in combination with the first pair of nip rolls, keep the film taut during the trimming operation. The film is then stored on windup roll 12 which rests on drive rolls 13.

The film made from the polymer dispersion of Example I is optically clear, uniform and tough. This film is particularly suitable for use in manufacture of safety glass laminates, because of its combination of optical clarity, heat-sealability, adhesion and freedom from holes, bubbles and other imperfections. The use of an electric potential in promoting gelation on the casting drum appears to be especially effective in eliminating small holes and imperfections which occasionally occur during gelation promoted only by a thermal gradient.

EXAMPLE VIII

In another embodiment of the method of this invention, copper magnet wire is passed into a bath of the aqueous polymer dispersion of Example I. An electric potential is maintained between the wire and the polymer reservoir, initiating gelation on the surface of the wire. The wire then passes upward, first through a steaming zone, then through a zone in which drying is completed under radiant heat and finally the wire is wound on a spool for storage. The resulting coating on the wire is thin, uniform, free from holes and imperfections and is very flexible and resistant to abrasion. The coated wire is suitable for service at 250° C.

EXAMPLE IX

A protective coating was formed on a copper tube by heating the tube to about 150° C. immersing the tube in the aqueous polymer dispersion of Example I for several minutes, removing the tube, steaming until the gel coating was tough, and drying in an oven. The coating was tough, adherent, transparent and water-resistant.

The method of this invention may be employed in other specific embodiments, as will be apparent to a skilled worker in the art.

What is claimed is:

1. A method of manufacturing a coated electrically conducting solid article comprising the steps:
    (a) initiating gelation of a solvated polymer at the positively charged surface of an electrically conducting solid article in an aqueous solvent system, said polymer having a hydrocarbon chain structure, possessing at least two carboxy substituents per molecule, said structure corresponding to a uniform random copolymer of ethylene containing 67–99 mol percent of units (a) and, correspondingly, 33–1 mol percent of a mixture of units (b), (c) and (d); said units (b) constituting 5–70 mol percent of the total of units (b), (c) and (d); and said units (c) constituting 20–80 mol percent of the total of units (b), (c) and (d); and said units (d) constituting a maximum of 75 mol percent of the total units of (b), (c) and (d);

said units (a) having the structure

—CH$_2$—CH$_2$— said units (b) having the structure

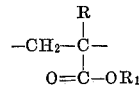

said units (c) having the structure

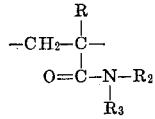

and said units (d) having the structure

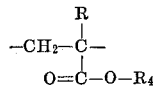

wherein R is selected from the group consisting of hydrogen and hydrocarbon groups, R$_1$ is selected from the group consisting of hydrogen and cations, R$_2$ and R$_3$ are independently selected from the group consisting of hydrogen, hydrocarbon groups and hydroxyalkyl groups, and R$_4$ is a hydrocarbon group, said units (b) and (c) being present in quantities sufficient to render the polymers dispersible in aqueous solvent systems;

(b) accumulating a body of polymer gel adjacent to the locus of initiation of gelation;

(c) removing from the aqueous solvent system the electrically conducting solid article bearing thereon the accumulated polymer gel; and (d) removing water from the polymer gel to yield a solid coating on the surface of the electrically conducting solid article.

2. The method of claim 1 wherein said solid article is fabricated from a material selected from a group consisting of stainless steel, copper and platinum.

3. The method of claim 1 wherein said solid article is copper wire.

4. The method of claim 1 wherein said aqueous solvent system contains a water-soluble alcohol.

5. The method of claim 1 to include the steps of:

(e) reinserting said solid article containing said solid coating into said equeous solvent system;

(f) initiating gelation of said solvated polymer at the positively charged surface of said coated solid article;

(g) accumulating a body of polymer gel adjacent to said coated solid article;

(h) removing from said aqueous solvent system the electrically conducting solid article bearing thereon a second coating of the accumulated polymer gel; and (i) removing water from the polymer gel to yield a solid coating on the surface of said electrically conducting solid article.

6. A method of forming a tough, adherent protective coating on a metal article comprising the following steps:

(a) intiating gelation of a solvated polymer at the surface of a metal article in an aqueous solvent system by heating the metal article to a higher temperature than the solvated polymer, introducing said heated metal article into said aqueous solvent system, said polymer having a hydrocarbon chain structure, possessing at least two carboxy substituents per molecule, said structure corresponding to a uniform random copolymer of ethylene containing 67–99 mol percent of units (a) and, correspondingly, 33–1 mol percent of a mixture of units (b), (c) and (d); said units (b) constituting 5–70 mol percent of the total of units (b), (c) and (d); said units (c) constituting 20–80 mol percent of the total of units (b), (c) and (d); and said units (d) constituting a maximum of 75 mol percent of the total units of (b), (c) and (d);

said units (a) having the structure

—CH$_2$—CH$_2$— said units (b) having the structure

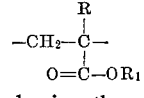

said units (c) having the structure

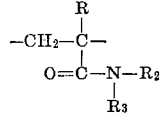

and said units (d) having the structure

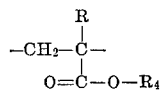

wherein R is selected from the group consisting of hydrogen and hydrocarbon groups, R$_1$ is selected from the group consisting of hydrogen and cations, R$_2$ and R$_3$ are independently selected from the group consisting of hydrogen, hydrocarbon groups and hydroxyalkyl groups, and R$_4$ is a hydrocarbon group, said units (b) and (c) being present in quantities sufficient to render the polymers dispersible in aqueous solvent systems;

(b) accumulating a body of polymer gel adjacent to the surface of said metal article;

(c) removing from the aqueous solvent system the metal article bearing thereon the accumulated polymer gel; and (d) removing water from the polymer gel to yield a tough adherent coating of polymer on said metal article.

7. The method of claim 6 wherein said metal article is a copper tube and wherein said copper tube is heated to a temperature of at least 150° C.

References Cited

UNITED STATES PATENTS

| | | | | |
|---|---|---|---|---|
| 3,404,080 | 10/1968 | Peacock | | 204—181 |
| 2,972,553 | 2/1961 | Hess | | 117—47H |

OTHER REFERENCES

Lewis, John R.: College Chemistry, 8th ed., New York, Barnes & Noble, 1965, p. 206.

ALFRED L. LEAVITT, Primary Examiner

J. A. BELL, Assistant Examiner

U.S. Cl. X.R.

117—47, 230; 204—56